United States Patent
Bickham et al.

(10) Patent No.: US 6,694,081 B2
(45) Date of Patent: Feb. 17, 2004

(54) DISPERSION MANAGED CABLE FOR WDM SYSTEMS

(75) Inventors: Scott R. Bickham, Corning, NY (US); Michael B. Cain, Corning, NY (US); James M. Grochocinski, Chester (GB)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/095,547

(22) Filed: Mar. 11, 2002

(65) Prior Publication Data

US 2002/0181907 A1 Dec. 5, 2002

Related U.S. Application Data

(60) Provisional application No. 60/283,410, filed on Apr. 12, 2001.

(51) Int. Cl.⁷ ................................................. G02B 6/02
(52) U.S. Cl. .......................... 385/123; 385/1; 359/161; 359/173
(58) Field of Search ................................. 385/123–128; 359/173, 161

(56) References Cited

U.S. PATENT DOCUMENTS

| | | | |
|---|---|---|---|
| 5,218,662 A | 6/1993 | Dugan | 385/123 |
| 5,365,362 A | 11/1994 | Gnauck et al. | 359/160 |
| 5,448,674 A | 9/1995 | Vengsarkar et al. | 385/123 |
| 5,559,920 A | 9/1996 | Chraplyvy et al. | 385/123 |
| 5,781,678 A | 7/1998 | Sano et al. | 385/45 |
| 5,793,917 A | 8/1998 | Yoshimura | 385/100 |
| 5,838,867 A | 11/1998 | Onishi et al. | 385/123 |
| 6,157,754 A | 12/2000 | Sasaoka et al. | 385/24 |
| 6,393,188 B1 | 5/2002 | Jeong et al. | 385/123 |
| 6,404,950 B1 | 6/2002 | Tsukitani et al. | 359/123 |
| 6,430,347 B1 | 8/2002 | Cain et al. | 385/123 |
| 2001/0017969 A1 * | 8/2001 | Kato | 385/123 |
| 2002/0164117 A1 | 11/2002 | Onishi et al. | 385/27 |

FOREIGN PATENT DOCUMENTS

| | | | |
|---|---|---|---|
| DE | 1035671 | 9/2000 | H04B/10/18 |
| EP | 0 777 347 A2 | 6/1997 | H04B/10/18 |
| WO | WO 02/37718 | 5/2002 | H04B/10/00 |

OTHER PUBLICATIONS

U.S. patent application Ser. No. 60/303,302, filed Jul. 6, 2001.

"Novel Network Fiber to Manage Dispersion at 1.55 μm with Combination of 1.3 μm Zero Dispersion Single Mode Fiber", Mukasa et al, ECOC 97, Sep. 22–25, 1997, Conference Publication No. 448, pp. 127–130.

"Negative Slope Dispersion Compensating Fibers", Berkey et ano, WM14–1/235, WM14–2/236, WM14–3/237.

"320 Gbit/s (32×10.7 Gbit/s) error–free transmission over 7280km using dispersion flattened fibre link with standard SMF and slope compensating DCF", Tanaka et al, Electronics Letters, Oct. 14, 1999, vol. 35, No. 21, pps 1860–1861.

(List continued on next page.)

Primary Examiner—Rodney Bovernick
Assistant Examiner—Sung Pak
(74) Attorney, Agent, or Firm—Joseph M. Homa; William J. Chervenak (57) ABSTRACT

Disclosed is a telecommunications system link that includes plurality of spans each having a transmission fiber and a compensating fiber. The compensating fiber is selected to completely compensate dispersion slope while only partially compensating total dispersion. This configuration compensates dispersion over an operating wavelength range while at the same time providing a transmission path having non-zero dispersion.

16 Claims, 3 Drawing Sheets

OTHER PUBLICATIONS

"Performance Comparison between SCDCF–based System and RDF–based System in Slope–Compensating Transoceanic WDM Transmission", Tsuritani et al, FC6–1/47, FC6–2/48, FC6–3/49.

"Dispersion–compensation–free 40–Gbit/s×4–channel WDM transmission experiment using zero–dispersion–flattened transmission line", Yonenaga et al, Optical Fiber Communication Conference, San Jose Convention Center, San Jose, California, PD20–1 through PD20–4.

T. Matsuda et al, "Dispersion Management Scheme for Suppressing FWM in DWDM Transmission", 1998 IEEE, pp. 372–373.

I. Morita et al, "40 Gbit/s x 16 WDM Transmission Over 2000 KM Using Dispersion Managed Low–Nonlinear Fiber Span", ECOC 2002, vol. IV, p. 25 (Post Deadline Paper T 1.5).

M. Murakami et al, "Long–Haul WDM Transmission Using Higher Order Fiber Dispersion Management", Journal of Lightwave Technology, vol. 18, No. 9, Sep. 2000, pp. 1197–1204.

M. Murakami et al, "Quarter Tbit/s (25X10 Gbit/s) Over 9288 km WDM Transmission Experiment Using Nonlinear Supported RZ Pulse in Higher Order Fiber Dispersion Managed Line", Electronics Letters, Mar. 18, 1999, vol. 35, No. 6, pp. 488–489.

M. Murakami et al, "Quarter Terabit (25+10 Gb/s) Over 9288 km WDM Transmission Experiment Using Nonlinear Supported RZ Pulse in Higher Order Fiber Dispersion Managed Line", ECOC'98, Sep. 20–24, 1998, pp. 79 & 81.

M. Murakami et al, "Long–Haul 16 + 10 Gb/s WDM Transmission Experiment Using Higher Order Fiber Dispersion Management Technique", IEEE Photonics Technology Letters, vol. 11. No. 7, Jul. 1999, pp. 898–900.

T. Tsuritani et al, "1 Tbit/s (10 +10.7 Gbit/s) transoceanic transmission using 30nm wide broadband optical repeaters with $A_{eff}$–enlarged positive dispersion fibre and slope–compensating DCF", Electronics Letters, Nov. 25, 1999, vol. 35, No. 24, pp. 2126–2128.

T. Tsuritani et al, "Performance comparison between SCDCF–based system and RDF–based system in slope–compensating transoceanic WDM transmission", Electronics Letters, Mar. 2, 2000, vol. 36, No. 5, pp. 447–448.

T. Tsuritani et al, "Performance Comparison between SCDCF–based System and RDF–based System in Slope–Compensating Transoceanic WDM Transmission", OFC 2000, 7010 Mar. 2000, vol. 4, pp. 47–49.

A. Eleterio, "Implementing DWDM and UDWM in Repeatered and Repeaterless Submarine Networks", IBC's Second Annual Conference on Submarine Communications, NEC Corporation, Nov. 17, 1999.

D. Peckham, "New Fiber Designs for Ocean Systems", KMI Corporation's $5^{th}$ Fiberoptic Submarine Systems Symposium, Baltimore, Maryland, Jun. 17–18, 1999.

J. Ryan, "Next–Generation NZ–DSF fibers will balance performance characteristics", Lightwave, Mar. 2000, pp. 146–152.

H. Taga et al., "Experimental demonstration of 680 Gbit/s capacity for the medium–haul undersea lightwave cable systems", Optical FiberCommunications Conference (OFC) of 2000, pp. 50–52, paper FC7–1.

K. Takashina et al., "1T bit/s (100chx10G bit/s) WDM Repeaterless Transmission over 200km with Raman Amplifier", Optical Fiber Communication Conference (OFC) of 2000, pp. 53–55, paper FC8–1.

* cited by examiner

DISPERSION MANAGED CABLE FOR WDM SYSTEMS

This application claims the benefit of U.S. Provisional Patent Application No. 60/283,410, filed Apr. 12, 2001.

BACKGROUND OF THE INVENTION

1. Field of the Invention

The present invention relates generally to dispersion compensated optical waveguide fiber telecommunication systems, and particularly to such telecommunication systems that incorporate wavelength division multiplexing.

2. Technical Background

In optical waveguide fiber telecommunication systems designed to operate at high data rates over distances of the order of at least a hundred kilometers, compensation of total dispersion has been recognized as an efficient means of facilitating the system by reducing the number of electronic regenerators required. The concept of total dispersion compensation is, generally, the incorporation into the system of a compensating waveguide fiber having total dispersion sign opposite that of the primary transmission fiber. (The sign convention in common use is that dispersion of a waveguide is said to be positive if light of shorter wavelength travels faster in the waveguide than does light of longer wavelength).

Because wavelength division multiplexed systems can accommodate higher data rates over the same waveguide fiber, the concept of total dispersion slope compensation, i.e., compensation of total dispersion over a range of wavelengths, was introduced. Perfect compensation over a range of wavelengths can be achieved by selecting the total dispersion and dispersion slope of the compensating fiber to be the same multiple of the total dispersion and dispersion slope of a transmission fiber, respectively, while having signs opposite to those of the transmission fiber. This choice of total dispersion slope in the compensating fiber provides the capability of equally compensating the total dispersion of each of a number of signal wavelengths in the operating wavelength range of the system. That is, substantially equal total dispersion compensation is provided for each of the channels in the wavelength division multiplexed system.

Non-linear optical effects, which become important in these high performance telecommunication systems, can be mitigated through use of relatively higher effective area optical waveguide fiber. In certain dispersion compensated systems, both relatively high as well as relatively low effective area waveguide fibers are used. Non-linear effects can be held to a minimum by placing the lower effective area fiber at locations in the system where signal intensity is lower, so that non-linearity has less negative impact on system performance.

Recent investigations have focused on waveguide fiber combinations including large effective area transmission waveguide fibers used in conjunction with compensating waveguide fibers that compensate the total dispersion over a wavelength range (total dispersion slope compensation). Because the refractive index profile design of total dispersion slope compensating fibers does not in general include the property of large effective area, strategies have been developed in which transmission fiber and compensating fiber have been optimally placed to limit non-linear effects as well as compensate total dispersion over an operating wavelength range of the optical waveguide system.

An advantageous system or link configuration is one using a compensating fiber that has total dispersion and total dispersion slope related to the corresponding parameters in the transmission fiber by the same integral multiple. For example, a transmission fiber having total dispersion D and total dispersion slope S can be compensated by a fiber having total dispersion −2D and total dispersion slope −2S by using in the system a transmission fiber length to compensating fiber length ratio of 2 to 1 within each of multiple sections of the total transmission path. The system is said to be perfectly compensated because the ratio of total dispersion to total dispersion slope, κ, is identical for the fibers making up the system. A disadvantage of this scheme of perfect compensation is that the average total dispersion is zero for the compensated spans that together make up the waveguide transmission path for the system. When wavelength division multiplexed signals spend a significant amount of travel time in waveguide sections having zero or near zero total dispersion, the non-linear-effects cross phase modulation and four wave mixing can adversely affect system performance and increase the physical bit error rate.

One can effectively move away from the perfect compensation format using fibers having identical total dispersion to total dispersion slope ratio, by adjusting the length ratio of transmission to compensating waveguide fiber. However there are drawbacks in this system design because additional lengths of either the transmission fiber or the compensating fiber must be inserted into the system to remove accumulated total dispersion or accumulated total dispersion slope. In systems where average negative total dispersion is desired within each section or span, the compensating fiber is relatively longer than the transmission fiber. In effect, the lower effective area, compensating fiber is located in parts of the system where signal intensity is relatively higher, so that non-linear effects are more pronounced. In the alternative case, systems where average positive dispersion is desired, a long span of compensating fiber is needed to remove accumulated positive total dispersion and positive total dispersion slope, thereby introducing pulse distortion due to self phase modulation. An alternative to the use of the span of compensating fiber is the introduction into the span of a dispersion compensating module designed to compensate either total dispersion, total dispersion slope, or both. The drawback in this case is that additional optical amplifiers must be used to offset the signal attenuation in the dispersion compensating module.

There is therefore a need for a compensation format that provides for spans making up a system, wherein the spans have a net negative or net positive average total dispersion without incurring the penalties associated with prior art compensation schemes. The present invention addresses this need.

SUMMARY OF THE INVENTION

One aspect of the present invention is an optical waveguide fiber telecommunications link including a plurality of spans optically coupled in series, i.e., end to end. As used in this specification, an optical waveguide fiber link refers to the total length of waveguide fiber that propagates light from a light signal transmitter to a receiver. The term link will be understood to include components such as optical amplifiers, optical couplers, or wavelength division multiplexers used in telecommunication systems. Each span includes a first and a second optical waveguide fiber. Each of these waveguide fibers is characterized by a total dispersion (the sum of waveguide and material dispersion) at a particular wavelength λ and by a total dispersion slope over a wavelength range, that includes λ, of operation of the link. The total dispersion slope of the respective first and second optical waveguide fibers are selected to be opposite in sign. The magnitudes of the respective total dispersion slopes are selected to provide a particular accumulated total dispersion over the span at the wavelength λ. Further, the respective total dispersion slopes are selected to provide, at the wavelengths over the operating wavelength range, accumulated total dispersion having a value within +/−10% of the value at wavelength λ or +/−10 ps/nm, whichever is larger. That is, the end to end dispersion of a span, measured in units of ps/nm, exhibits the same value to within the larger of +/−10 ps/nm or +/−10% at each wavelength over the wavelength range. The span is said to be compensated over the wavelength range. Accumulated total dispersion, the dispersion experienced by a signal pulse traversing a length of waveguide fiber, is the product of fiber total dispersion times fiber length.

The total dispersion of each span is not completely compensated, i.e., total dispersion accumulates over length, because, in the instant invention, the respective products of total dispersion times length of the first and second fiber are not equal. The signs of the respective total dispersions of the first and second fibers are opposite to provide for partial-dispersion compensation of each of the spans. The respective values for ratio of total dispersion to total dispersion slope, κ, of the first and second fibers are not equal.

An operating wavelength range of the link which takes advantage of a low attenuation window of silica based optical waveguide fibers is from about 1480 nm to 1620 nm.

The average total dispersion of the link of the plurality of spans has an absolute value which lies in a range that does not include zero. This link average total dispersion can be defined in terms of span average total dispersion. The span average total dispersion is defined as the total dispersion of the first fiber multiplied by its length plus the total dispersion of the second fiber multiplied by its length, the sum (the accumulated total dispersion) then divided by the total span length. The average total dispersion of the link is the sum of the respective average total dispersion of each span making up the plurality of spans included in the link divided by the number of spans.

In another embodiment of this first aspect of the invention, the absolute value of the average total dispersion of the link has a range from 0.50 ps/nm-km to 4 ps/nm-km. An average total dispersion of the link in this range advantageously limits the non-linear phenomena four wave mixing and cross phase modulation.

Yet another embodiment in accord with the first aspect of the invention, includes a dispersion compensation module having zero total dispersion slope, and a total dispersion selected to compensate the accumulated total dispersion of the link. That is, the dispersion compensation module has accumulated total dispersion about equal in magnitude and opposite in sign to the accumulated total dispersion of the plurality of spans. In accord with the definition stated above, the accumulated total dispersion of the spans is the sum of length multiplied by total dispersion for each of the fibers making up the spans. The sum is taken over all the fibers making up the plurality of spans included in the link. The dispersion compensation module can be optically coupled essentially anywhere in the link. In cases where the effective area of the fiber in the compensation module is relatively small, the compensation module is coupled into the link at a point where the optical signal intensity is relatively low, i.e., the compensation module is spaced apart from the transmitters or amplifiers included in the link. An example of optimum placement of the compensation module is in the middle of a fiber length between a dual stage amplifier.

In an embodiment in accord with the first aspect of the invention, the first fiber of a span has positive total dispersion and the second fiber of the span has a negative total dispersion. The total dispersion of the second fiber has a magnitude of total dispersion less than that of the first fiber by an amount ranging from 2 ps/nm-km to 4 ps/nm-km. For example, the first fiber may have a dispersion of +19 ps/nm/km and the second a dispersion of −15 to −17 ps/nm/km. This configuration provides for local total dispersion along the link which is positive, an advantageous condition in terrestrial optical telecommunications systems. In a related embodiment, the negative total dispersion fiber in the span is greater in magnitude by a prescribed amount, for example, 2 ps/nm-km to 4 ps/nm-km. For example, the first fiber may have a dispersion of +19 ps/nm/km and the second a dispersion of −23 to −21 ps/nm/km. This configuration provides for local total dispersion along the link which is negative, a characteristic desired in certain systems, for example, in those in which soliton formation is to be suppressed or modulational instability should be reduced. In each of the two embodiments, the total dispersion slope of the fibers in a span are related to each other by a multiple factor in the range of 1 to 2. For a proper choice of respective lengths of the first and second fibers, the relationship between the respective total dispersion slopes allows for a compensation over the operating wavelength range in which a target total dispersion at each wavelength in the range can be achieved to within a desired tolerance, for example, +/−10%.

In a further embodiment of this aspect of the invention, the first and second optical waveguide fibers in each span have respective positive and negative total dispersion and total dispersion slope. The magnitude of the total dispersion of the second fiber in the span is less than twice the magnitude of the first fiber in the span by an amount in the range from about 2 ps/nm-km to 10 ps/nm-km. The magnitude of the total dispersion slope of the second fiber is related to the magnitude of the total dispersion slope of the first fiber by a multiple in the range of 1 to 2. In this configuration, the total length of the second fibers making up the link is less, but, by proper choice of the multiple, the total dispersion slope can be compensated to within a desired tolerance for each of the channels located within the link operating wavelength range. In a related embodiment, the total dispersion slope of the second fiber again is related to that of the first fiber by a multiple in the range of 1 to 2, and the total dispersion of the second fiber is greater than twice that of the first by an amount ranging from about 2 ps/nm-km to 10 ps/nm-km. The signs of total dispersion and total dispersion slopes are, respectively, positive and negative for the first and second optical waveguide fibers.

A particular advantageous choice of ranges of total dispersion and total dispersion slope for the first fiber in each of the plurality of spans is 17 ps/nm-km to 21 ps/nm-km and 0.05 ps/nm$^2$-km to 0.08 ps/nm$^2$-km, respectively.

In yet a further embodiment of the first aspect, a dispersion compensation module is optically coupled into the link at the input, i.e., the transmitter end, of the link. The dispersion compensation module is selected to have zero dispersion slope over the operating wavelength range of the link. The accumulated total dispersion of the module is selected to be opposite in sign to the accumulated total dispersion of the plurality of spans included in the link. This configuration provides an initial bias of the signal dispersion. Then, as the signal traverses the plurality of spans, the signal dispersion becomes closer to zero. Any residual accumulated total dispersion in the signal after traversing the dispersion compensation module at the input and the plurality of spans can be reduced to any pre-selected value, which can be chosen to be zero, by optically coupling an additional dispersion compensation module, having zero total dispersion slope and a pre-selected accumulated total dispersion, into the link.

The mode field diameter of the first fiber is in general not equal to that of the second fiber of a span, because the refractive index profiles of the two fibers are different. This mismatch of respective mode field diameters can result in unacceptably high splicing or connecting loss. To minimize such loss, a third fiber type may be used to serve as a splicing or connecting bridge (a bridge fiber) between the first and second fibers of a span or at other splices or connections within the link where the fibers to be spliced or connected are of unequal mode field diameter. Such a bridge fiber and the method using the bridge fiber is disclosed and described in application U.S. Ser. No. 60/303,302, entitled "Method of Connecting Optical Fibers, an Optical Fiber Therefor and an Optical Fiber Span Therefrom", filed on Jul. 6, 2001 which is incorporated herein in its entirety by reference.

Thus an advantageous embodiment of the invention in accord with the first aspect of the invention and the other embodiments thereof disclosed and described herein further includes a bridge fiber at splices or connections between fibers in the link having a mismatch in mode field diameter.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
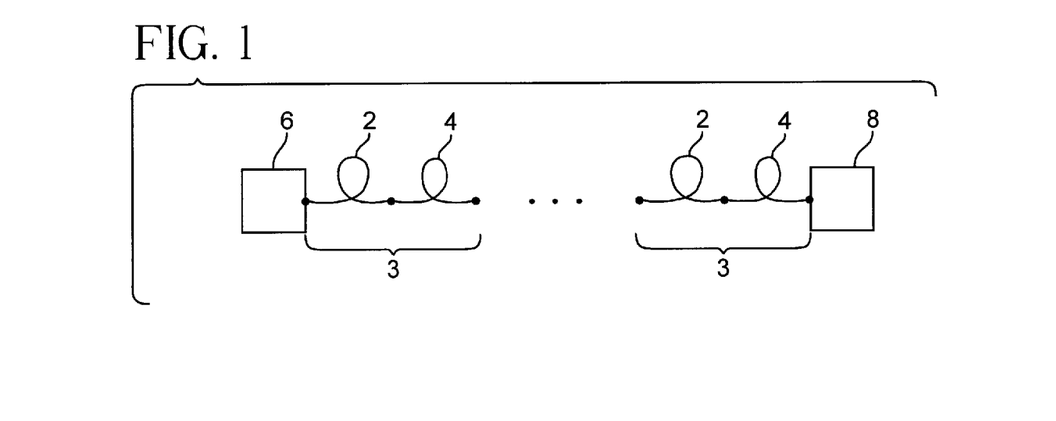
FIG. 1 is an illustration of a link including spans in accord with the invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the optical waveguide fiber telecommunication link of the present invention is shown in FIG. 1. A span of waveguide fiber includes a first fiber 2 and a second fiber 4. The respective first and second fibers, 2 and 4, are each characterized by a total dispersion and a total dispersion slope. Compensation is achieved by selecting the total dispersion and total dispersion slope of the first fiber 2 to be of opposite sign relative to total dispersion and total dispersion slope of second fiber 4. In particular, the total dispersion slope of fiber 2 is related to that of fiber 4 in such a way that total dispersion can be compensated substantially equally over a range of wavelengths, for example, the operating wavelength range of a wavelength division multiplexed system.

The ratio of total dispersion to total dispersion slope, designated κ, is different for fiber 2 as compared to fiber 4.

The telecommunications link is made up of a plurality of spans 3 that optically connect optical signal transmitter 6 to optical receiver 8. It will be understood that two way transmission is possible over the link in accord with the invention. Thus elements 6 and 8 of FIG. 1 can also each be a combination transmitter and receiver. Elements 6 and 8 can also include the devices know in the art to enable or improve link performance, for example, a device to enable wavelength division multiplexing and de-multiplexing.

Figure 2:
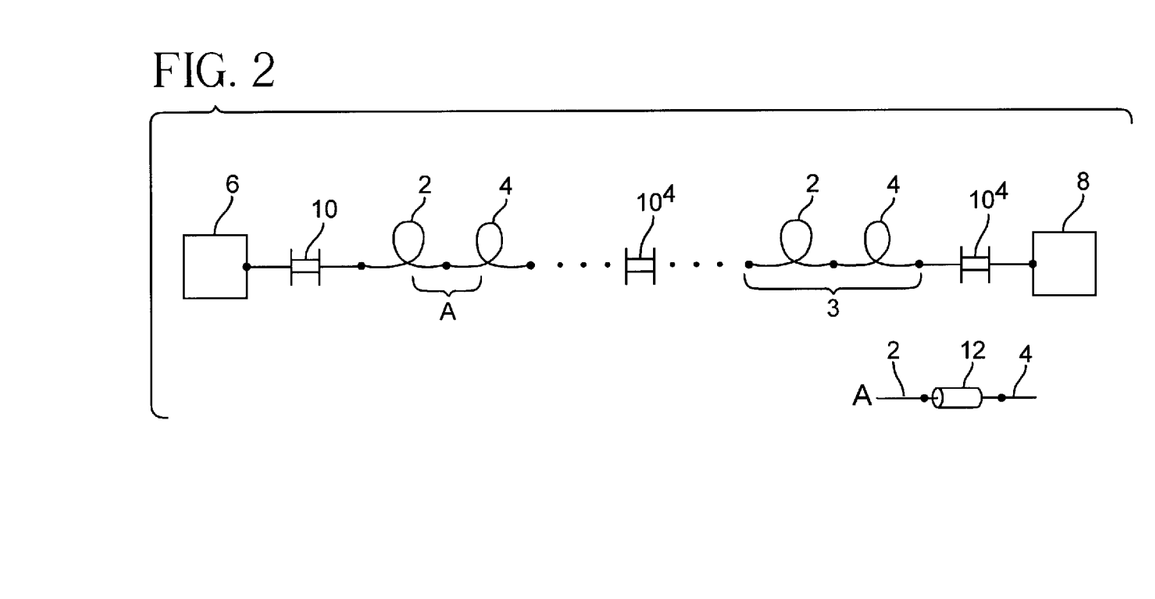
FIG. 2 is an illustration of a link including spans, an input dispersion compensation module, and an additional dispersion compensation module in accord with the invention.

FIG. 2 illustrates another embodiment of the telecommunication link in accord with the invention. The elements common to the respective embodiments of FIGS. 1 and 2 are numbered the same. The spans of FIG. 2, each including respective fibers 2 and 4, again provide an optical path between transmitting device 6 and receiving device 8. A dispersion compensation module 10 is optically coupled into the link at the input end thereof, i.e., at the end nearest transmitter 6. Dispersion compensation module 10 is selected to have a zero total dispersion slope so that the compensation module 10 has no impact on total dispersion slope compensation. The accumulated total dispersion of module 10 can be selected to have a sign opposite the sign of the total dispersion that accumulates in the link due to the accumulation of total dispersion in each span 3. The accumulated total dispersion of the link, expressed in units of ps/nm, is the sum of the accumulated dispersions of the respective spans 3 plus the accumulated total dispersion of the compensation module 10. The dispersion which accumulates in each span is the sum of the length of fiber 2 multiplied by the total dispersion of fiber 2 and the length of fiber 4 multiplied by the total dispersion of fiber 4. By placing a compensation module 10 at the link input, the optical signal pulse has been dispersed before entering the first span. Because of the choice of sign of the accumulated total dispersion of module 10, as the optical signal traverses each span, the dispersion of the pulse is decreased. In an ideal case, the dispersion of the optical signal pulse reaches zero, or in some cases 0+/−100 ps/nm, at or near the end of the link at receiver 8. If the dispersion of the optical pulse is not zero after exiting the final span of the link, a second dispersion compensation module 10' can be included in the link, either at the output end of the link at receiver 8 or at an intermediate position in the link as illustrated by dispersion compensation module 10".

The link configurations of both FIG. 1 and FIG. 2 provide a transmission path for an optical signal pulse in which the optical signal travels in fiber spans having non-zero total dispersion for a large fraction, of the order of not less than about 0.9, of the total link length. At the same time, total dispersion slope can be, to within a pre-selected target, compensated over the operating wavelength range of the link. A proper choice of compensation module 10, obviates the need for additional compensation modules, 10' or 10". These latter modules are sometimes useful because, in a practical installation, the length of the spans cannot always be optimized to provide the desired accumulated total dispersion of the link. For example, departure from ideal span length may occur due to the spacing of access points to the installed cable.

A bridge fiber 12 can be advantageously used at the splice or connection point of dissimilar fibers, such as between fibers 2 and 4 as shown in detail A of FIG. 2. In the design of compensation fiber 4, every effort is made to optimize the waveguide fiber properties so that the lengths of fiber 4 that are used in the link do not adversely impact link installation or operation. However, in those cases in which there is a mismatch between the mode field diameters of the respective fibers 2 and 4, a bridge fiber is effective to minimize splice loss due to this mismatch.

Link Example

With reference to FIG. 2, a telecommunication link is modeled that includes ten spans, each span being 80 km in length, and a dispersion compensation module 10 optically coupled into the link at the input end. Each span includes a first fiber 2 of length 40 km and a second fiber 4 of length 40 km. At 1535 nm, fiber 2 has total dispersion 18.7 ps/nm-km and, over an operating window from 1535 nm to 1561 nm, total dispersion slope 0.06 ps/nm²-km. This provides a κ value of 312. Fiber 4 has total dispersion −15.7 ps/nm-km at 1535 nm and total dispersion slope −0.06 ps/nm²-km over the wavelength range from 1535 nm to 1561 nm. For fiber 4, κ is 262. The multiple relationship between total dispersion slope of the first fiber and the total dispersion slope of the second fiber is 1 in this example. Dispersion compensation module 10 has accumulated total dispersion of −1200 ps/nm and zero dispersion slope.

Figure 3:
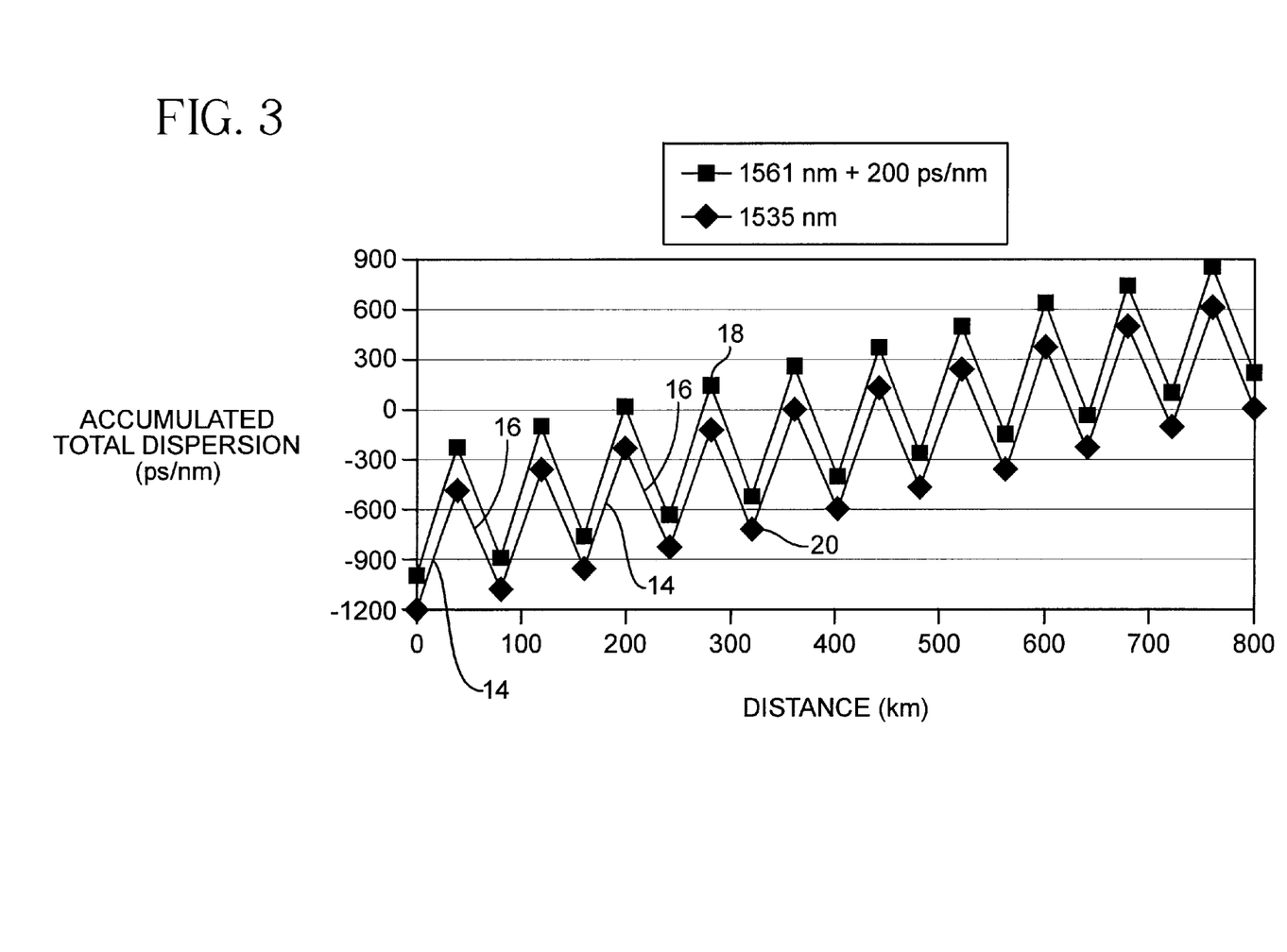
FIG. 3 is a chart of link total dispersion versus link length using a compensating fiber in accord with the invention.

The performance of this telecommunication link can be discussed with reference to FIG. 3, which is a chart of the link dispersion versus link length. In FIG. 3, considering first the set of points 20 represented by diamonds, the properties of the link at wavelength of 1535 nm is shown. The accumulated total dispersion of each span versus length is represented by an ascending portion 14, corresponding to the positive total dispersion of fiber 2, and a descending portion 16, corresponding to negative total dispersion fiber 4.

The properties of a single span are:

*Average total dispersion*−{(40 km×18.7 ps/nm-km)+(40 km×−15.7 ps/nm-km)}/80 km=1.5 ps/nm/km;

*Cumulative total dispersion*−{(40 km×18.7 ps/nm-km)+(40 km×−15.7 ps/nm-km)}/80 km=120 ps/nm/km;

and,

*Average total dispersion slope*−{(40 km×0.06 ps/nm²-km)+(40 km×−0.06 ps/nm²-km)}/80=0 ps/nm².

The accumulated total dispersion of the compensation module, −1200 ps/nm, is equal in magnitude and opposite in sign to the link accumulated total dispersion, (10 spans×120 ps/nm/span=1200 ps/nm), so that no additional compensation modules, either 10' or 10", are needed to reduce accumulated link total dispersion to a desired value.

The performance of the example system at 1561 nm is shown as square shaped points 18. In order for the points 18 to be visible on the chart, the modeled data was offset by 200 ps/nm. The model calculations descriptive of system performance at 1561 nm are analogous to those for the system at 1535 nm. The total dispersion slope is the same at both example wavelengths as is the length of the fibers in the spans and the number of spans. The total dispersion at 1561 nm is found by multiplying the total dispersion slope by the difference in wavelength, 26 nm in this case, and adding this result to the values of total dispersion given at 1535 nm.

The lines joining the points representing either the 1535 nm case or the 1561 nm case cross the zero total dispersion line nine times over the 800 km span length. Given a magnitude of total dispersion of 18.7 to 15.7 ps/nm-km, at each crossing the signal experiences a total dispersion less that 0.5 ps/nm-km for less than 100 m at each crossing. Thus the fraction of the 800 km length over which four wave mixing or cross phase modulation have significant effect is negligible. The distortion of the pulse due to these effects is therefore negligible. In addition, the crossings occur where optical power in the link is relatively lower, further limiting non-linear effects.

Span Example

Figure 4:
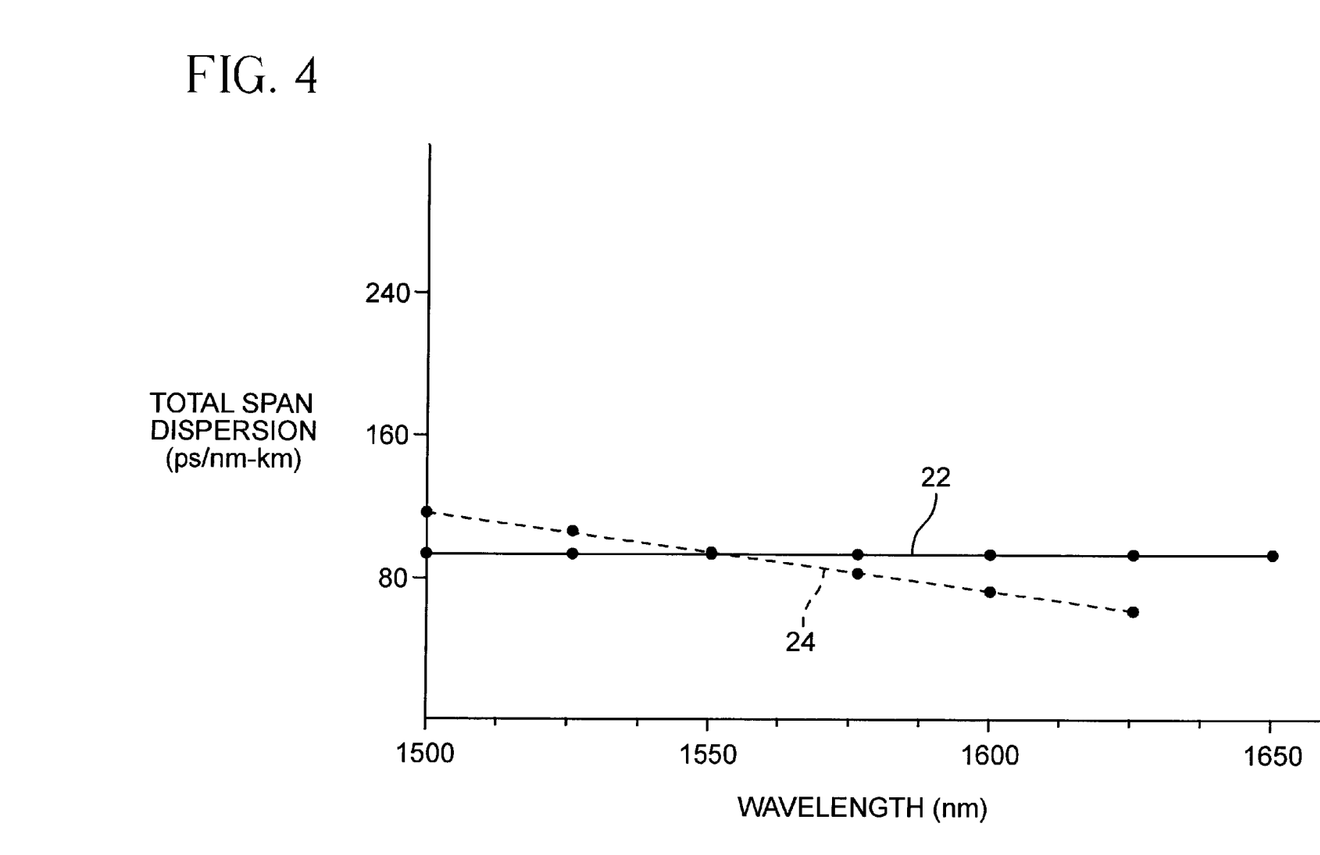
FIG. 4 is a chart of span accumulated total dispersion versus wavelength.

The impact of a slight variation in total dispersion slope of one of the fibers can be seen with reference to FIG. 4 which is a chart of accumulated span total dispersion versus wavelength for a two fiber span in a first case where the total dispersion slopes of the two fibers are equal in magnitude, curve 22, and in a second case where the total dispersion slopes are of slightly different magnitudes, curve 24.

Considering an arrangement corresponding to curve 22, the first fiber has a positive total dispersion 18.7 ps/nm-km at 1550 nm, a positive slope of 0.06 ps/nm²-km over an operating wavelength range within the range 1500 nm to 1650 nm, and a length of 40 km. The second fiber has negative total dispersion −16.3 ps/nm-km at 1550 nm, negative total dispersion slope −0.06 ps/nm²-km, and length 40 km, over the same operation wavelength range. The accumulated span total dispersion, in analogy with the calculation in the link example above, is 96 ps/nm at 1550 nm. At 1500 nm, the accumulated span dispersion is calculated by adjusting the total dispersion of each fiber using the total dispersion slope. Because the magnitudes of the respective total dispersion slopes of the first and second fiber are equal, the accumulated span total dispersion is also 96 ps/nm at 1500 nm. This same value of accumulated span total dispersion is found at each wavelength for which the respective total dispersion slopes of the first and second fiber are of equal magnitude. This configuration can be referred to as perfect slope compensation as is shown by the horizontal curve 22.

In a second arrangement of the example all fiber parameters are the same as in the first arrangement except that the slope of the second fiber is taken to be −0.07 ps/nm²-km over the wavelength range charted. In this case, total dispersion slope compensation is not perfect, giving rise to curve 24 having an accumulated span total dispersion of 116 ps/nm at 1500 nm and 76 ps/nm at 1600 nm. In this second arrangement, the total dispersion slope compensation is within +/−10% of the target value 96 ps/nm over the wavelength range from about 1525 nm to 1575 nm. Thus, acceptable compensation over an extended operating wavelength can be achieved even for differences in total dispersion slope magnitude of 0.01 ps/nm²-km. Compensation of total dispersion slope in accord with the invention can be accomplished using optical waveguide fiber having a comparatively large variation in parameters due to manufacturing, cabling, or installation.

Examples of compensating fibers having functional properties that provide for a telecommunication link in accord with the invention are shown in the table following.

TABLE

| Total Disperion @ 1550 nm ps/nm-km | Slope @ 1550 nm ps/nm²-km | κ nm | Effective Area μm² |
|---|---|---|---|
| −16.7 | −0.06 | 278 | 30 |
| −46.0 | −0.12 | 383 | 25 |

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. An optical waveguide fiber telecommunication link having an operating wavelength range comprising:

a plurality of spans optically coupled in series arrangement, each said span including a first optical waveguide fiber having a first total dispersion at a wavelength $\lambda$ within the operating wavelength range, a first total dispersion slope over the operating wavelength range, and, optically connected in series arrangement to said first optical waveguide fiber, a second optical waveguide fiber having a second total dispersion at the wavelength $\lambda$, and a second total dispersion slope over the operating wavelength range, wherein, the operating wavelength range is 1525 nm to 1575 nm;

the sign of the first total dispersion is opposite the sign of the second total dispersion, the sign of the first total dispersion slope is opposite the sign of the second total dispersion slope, the respective first and second total dispersion slopes are selected to provide an accumulated total dispersion of any of the plurality of spans at the wavelength $\lambda$, and, at each wavelength over the operating wavelength range, the value of accumulated total dispersion being within a range of +/−10% of the accumulated total dispersion of the span at the wavelength $\lambda$, the ratio of first total dispersion to first total dispersion slope at the wavelength $\lambda$ is not equal to the ratio of second total dispersion to second total dispersion slope at the wavelength $\lambda$, and the plurality of spans optically coupled in series arrangement have a positive average total dispersion at each wavelength over the operating wavelength range, the average total dispersion of said plurality of spans ranging from 0.50 ps/nm-km to 4 ps/nm-km.

2. The optical waveguide fiber telecommunication link of claim 1 wherein the operating wavelength range of said link is 1480 nm to 1620 nm.

3. The optical waveguide fiber telecommunication link of claim 1 wherein, said plurality of spans has an accumulated total dispersion, said link further comprising a dispersion compensation module optically connected in series arrangement into said plurality of spans, the dispersion compensation module having a zero dispersion slope and an accumulated total dispersion, wherein, the accumulated dispersion of said dispersion compensation module is equal in magnitude and opposite in sign to the accumulated dispersion of said plurality of spans.

4. The optical waveguide fiber telecommunication link of claim 1 wherein said first optical waveguide fiber has a positive total dispersion, said second optical waveguide fiber has a negative total dispersion having a magnitude less than that of said first optical waveguide fiber so that total dispersion of the link is positive and has an average value of ranging from 2 ps/nm-km to 4 ps/nm-km and the respective total dispersion slopes of said first and second optical waveguide fibers are related by a multiple factor in the range from 1 to 2.

5. The optical waveguide fiber telecommunication link of claim 1 wherein said first optical waveguide fiber has a positive total dispersion, said second optical waveguide fiber has a negative total dispersion having a magnitude greater than that of said first optical waveguide fiber by an amount ranging from 2 ps/nm-km to 4 ps/nm-km and the respective total dispersion slopes of said first and second optical waveguide fibers are related by a multiple factor in the range from 1 to 2.

6. The optical waveguide fiber telecommunication link of claim 1 wherein said first optical waveguide fiber has positive total dispersion and total dispersion slope, said second optical waveguide fiber has negative total dispersion having a magnitude less than twice that of said first optical waveguide fiber by an amount ranging from 2 ps/nm-km to 10 ps/nm-km and the total dispersion slope of said second optical waveguide fibers is a multiple factor in the range of 1 to 2 times that of said first optical waveguide fiber.

7. The optical waveguide fiber telecommunication link of claim 1 wherein said first optical waveguide fiber has a positive total dispersion, said second optical waveguide fiber has a negative total dispersion having a magnitude greater than twice that of said first optical waveguide fiber by an amount ranging from 2 ps/nm-km to 10 ps/nm-km and the total dispersion slope of said second optical waveguide fibers is a multiple factor in the range of 1 to 2 times that of said first optical waveguide fiber.

8. The optical waveguide fiber telecommunications link of any one of claims 3, 4, 5, 6, or 7 wherein said first optical waveguide fiber has a total dispersion ranging from 17 ps/nm-km to 21 ps/nm-km and a total dispersion slope ranging from 0.05 ps/nm²-km to 0.08 ps/nm²-km.

9. The optical waveguide fiber telecommunications link of claim 1, said link having an input end, further including a dispersion compensation module optically coupled in series arrangement at the input end of said link, said dispersion compensation module having a non-zero accumulated total dispersion opposite in sign to the accumulated dispersion of said plurality of spans and a total dispersion slope of about zero.

10. The optical waveguide fiber telecommunications link of claim 9 having an accumulated total dispersion and further including a second dispersion compensation module optically coupled in series arrangement into said plurality of spans, said second dispersion compensation module having an accumulated total dispersion of magnitude and sign selected to provide an accumulated total dispersion of said link of about zero.

11. The optical waveguide fiber telecommunications link of any one of claims 1, 3, 4, 5, 6, 7 or 9, further including a bridge fiber optically coupled in series arrangement into the link at locations in the link whereat fibers of different mode field diameter are spliced or otherwise connected.

12. An optical waveguide fiber telecommunication link having an operating wavelength range comprising:

a plurality of spans optically coupled in series arrangement, each said span including a first optical waveguide fiber having a first total dispersion at a wavelength $\lambda$ within the operating wavelength range, a first total dispersion slope over the operating wavelength range, and, optically connected in series arrangement to said first optical waveguide fiber, a second optical waveguide fiber having a second total dispersion at the wavelength $\lambda$, and a second total dispersion slope over the operating wavelength range, wherein, the operating wavelength range is 1525 nm to 1575 nm;

the sign of the first total dispersion is opposite the sign of the second total dispersion, the sign of the first total dispersion slope is opposite the sign of the second total dispersion slope, the respective first and second total dispersion slopes are selected to provide an accumulated total dispersion of the span at each wavelength over the operating wavelength range within a range of +/−10 ps/nm, the ratio of first total dispersion to first total dispersion slope is not equal to the ratio of second total dispersion to second total dispersion slope, and the plurality of spans optically coupled in series arrangement have a positive average total dispersion at each wavelength over the operating wavelength range, the average total dispersion of said plurality of spans ranging from 0.50 ps/nm-km to 4 ps/nm-km.

13. The optical waveguide fiber telecommunications link of claim 1 wherein the operating wavelength range of said link is 1500 nm to 1650 nm.

14. The optical waveguide fiber telecommunications link of claim 1 wherein the ratio of first total dispersion to first total dispersion slope differs from the ratio of second total dispersion to second total dispersion slope by between about 11% to about 25%.

15. An optical waveguide fiber telecommunication link having an operating wavelength range comprising:

a plurality of spans optically coupled in series arrangement, each said span including a first optical waveguide fiber having a first total dispersion at a wavelength $\lambda$ within the operating wavelength range, a first total dispersion slope over the operating wavelength range, and, optically connected in series arrangement to said first optical waveguide fiber, a second optical waveguide fiber having a second total dispersion at the wavelength $\lambda$, and a second total dispersion slope over the operating wavelength range, wherein, the sign of the first total dispersion is opposite the sign of the second total dispersion, the sign of the first total dispersion slope is opposite the sign of the second total dispersion slope, the respective first and second total dispersion slopes are selected to provide an accumulated total dispersion of any of the plurality of spans at the wavelength $\lambda$, and, at each wavelength over the operating wavelength range, the value of accumulated total dispersion being within a range of +/−10% of the accumulated total dispersion of the span at the wavelength $\lambda$, the ratio of first total dispersion to first total dispersion slope at the wavelength $\lambda$ is not equal to the ratio of second total dispersion to second total dispersion slope at the wavelength $\lambda$, and the first optical waveguide fiber has a positive total dispersion, the second optical waveguide fiber has a negative total dispersion having a magnitude less than that of the first optical waveguide fiber so that total dispersion of the link is positive and has an average value of ranging from 2 ps/nm-km to 4 ps/nm-km and the respective total dispersion slopes of the first and second optical waveguide fibers are related by a multiple factor in the range from 1 to 2.

16. An optical waveguide fiber telecommunication link having an operating wavelength range comprising:

a plurality of spans optically coupled in series arrangement, each said span including a first optical waveguide fiber having a first total dispersion at a wavelength $\lambda$ within the operating wavelength range, a first total dispersion slope over the operating wavelength range, and, optically connected in series arrangement to said first optical waveguide fiber, a second optical waveguide fiber having a second total dispersion at the wavelength $\lambda$, and a second total dispersion slope over the operating wavelength range, wherein, the sign of the first total dispersion is opposite the sign of the second total dispersion, the sign of the first total dispersion slope is opposite the sign of the second total dispersion slope, the respective first and second total dispersion slopes are selected to provide an accumulated total dispersion of any of the plurality of spans at the wavelength $\lambda$, and, at each wavelength over the operating wavelength range, the value of accumulated total dispersion being within a range of +/−10% of the accumulated total dispersion of the span at the wavelength $\lambda$, the ratio of first total dispersion to first total dispersion slope at the wavelength $\lambda$ is not equal to the ratio of second total dispersion to second total dispersion slope at the wavelength $\lambda$, and the first optical waveguide fiber has positive total dispersion and total dispersion slope, the second optical waveguide fiber has negative total dispersion having a magnitude less than twice that of the first optical waveguide fiber by an amount ranging from 2 ps/nm-km to 10 ps/nm-km and the total dispersion slope of the second optical waveguide fibers is a multiple factor in the range of 1 to 2 times that of the first optical waveguide fiber.

* * * * *